(12) United States Patent
Choi (10) Patent No.: US 10,939,771 B2
(45) Date of Patent: Mar. 9, 2021

(54) FOLDING BEDSTEAD

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 147 days.

(21) Appl. No.: 15/693,044

(22) Filed: Aug. 31, 2017

(65) Prior Publication Data

US 2018/0055235 A1  Mar. 1, 2018

(30) Foreign Application Priority Data

Aug. 31, 2016 (CN) .......................... 201621000707.3

(51) Int. Cl.
*A47C 19/00* (2006.01)
*A47C 19/12* (2006.01)
*F16B 12/56* (2006.01)

(52) U.S. Cl.
CPC ............ *A47C 19/005* (2013.01); *A47C 19/12* (2013.01); *F16B 12/56* (2013.01)

(58) Field of Classification Search
CPC ..... A47C 19/005; A47C 19/12; A47C 19/126; A47C 17/64; A47C 19/00; A47C 19/04; A47C 19/14; A47C 19/021; A47C 19/025; A47C 19/027; A47C 19/128; A47D 9/005; A47D 13/04; A47D 13/06; A47D 13/061; A47D 13/063; A47D 13/066; A47D 13/065; F16B 12/56; A57C 19/024
See application file for complete search history.

(56) References Cited

U.S. PATENT DOCUMENTS

| | | | |
|---|---|---|---|
| 5,656 | A | 7/1848 | Hinckley |
| 13,034 | A | 6/1855 | Hesz |
| 246,028 | A | 8/1881 | Meyer |
| 489,229 | A | 1/1893 | McClintock |
| 544,615 | A | 8/1895 | Fraser |
| 683,264 | A | 9/1901 | Flemister |

(Continued)

FOREIGN PATENT DOCUMENTS

| CN | 204670760 U | 9/2015 | |
|---|---|---|---|
| WO | WO-2013056207 A1 * | 4/2013 | |

OTHER PUBLICATIONS

Screen captures from YouTube video clip entitled "Zinus | Easy to Assemble Smartbase (Official)," uploaded on Apr. 6, 2016 by user "Zinus". retrieved from Internet: <https://www.youtube.com/watch?v=lknPMnJRtWc> (Year: 2016).*

(Continued)

*Primary Examiner* — Robert G Santos
*Assistant Examiner* — Alison N Labarge
(74) *Attorney, Agent, or Firm* — Morgan, Lewis & Bockius LLP (57) ABSTRACT

A bedstead includes a frame with first and second lateral bars and first and second longitudinal bars connected to each other at their adjacent ends. The bedstead also includes an interior support disposed in the interior defined by the frame when the bedstead is in the unfolded state. The interior support includes a hub with a plurality of notches, and a plurality of connecting bars each having a first end portion pivotally connected with a notch of the hub and a second end portion removably connected with the frame.

20 Claims, 6 Drawing Sheets

(56) References Cited

U.S. PATENT DOCUMENTS

| | | | | |
|---|---|---|---|---|
| 930,340 | A * | 8/1909 | Berry | A47C 19/025 5/305 |
| 1,304,419 | A | 5/1919 | Van Volkenburg | |
| 1,427,020 | A | 8/1922 | Rooks | |
| 1,781,807 | A | 11/1930 | De Leon | |
| 1,798,546 | A | 3/1931 | Lillibridge | |
| 2,492,070 | A | 12/1949 | Stone et al. | |
| 3,768,106 | A * | 10/1973 | Fitzgerald | A47C 19/021 5/131 |
| 3,842,451 | A | 10/1974 | McCormick | |
| 4,263,683 | A * | 4/1981 | Knoke | A47C 19/04 5/200.1 |
| 4,536,904 | A | 8/1985 | Whitehead | |
| 4,638,517 | A | 1/1987 | Yang | |
| 4,811,437 | A | 3/1989 | Dillner | |
| 5,819,342 | A | 10/1998 | Williams | |
| 5,937,457 | A * | 8/1999 | Wang | A47D 13/063 5/98.1 |
| 6,295,667 | B1 | 10/2001 | Cheng | |
| 6,473,919 | B1 | 11/2002 | Wang | |
| 6,510,569 | B1 | 1/2003 | Hu | |
| 7,073,218 | B2 | 7/2006 | Polevoy | |
| 7,757,314 | B2 * | 7/2010 | Yul | A47C 19/14 5/110 |
| 7,836,530 | B2 | 11/2010 | Thorne | |
| 8,006,330 | B2 * | 8/2011 | Lee | A47C 19/126 5/176.1 |
| 8,051,508 | B2 | 11/2011 | Yu | |
| 8,966,679 | B2 | 3/2015 | Mendes | |
| 8,978,176 | B1 | 3/2015 | Oh | |
| 9,155,402 | B1 * | 10/2015 | Whitman | A47D 7/002 |
| 10,034,551 | B2 * | 7/2018 | Hull | A47C 19/12 |
| 2005/0039258 | A1 | 2/2005 | Gavela Vazquez | |
| 2010/0138994 | A1 * | 6/2010 | Lee | A47C 19/022 5/400 |
| 2010/0299831 | A1 * | 12/2010 | Lee | A47C 19/126 5/202 |
| 2011/0073147 | A1 * | 3/2011 | Choi | E04H 15/48 135/135 |
| 2012/0304380 | A1 | 12/2012 | Jin | |
| 2013/0117932 | A1 | 5/2013 | Stewart | |
| 2013/0291300 | A1 | 11/2013 | Bly | |
| 2015/0143630 | A1 * | 5/2015 | Harrow | A47C 19/12 5/400 |
| 2015/0284974 | A1 * | 10/2015 | Choi | E04H 15/32 135/120.3 |
| 2016/0143447 | A1 * | 5/2016 | Hull | A47C 19/12 5/202 |
| 2016/0198860 | A1 | 7/2016 | Salermo | |
| 2016/0206112 | A1 * | 7/2016 | Oh | A47C 19/126 |
| 2016/0255963 | A1 | 9/2016 | Jones | |
| 2016/0316921 | A1 | 11/2016 | Choi | |
| 2017/0208954 | A1 | 7/2017 | Lee | |
| 2018/0055235 | A1 | 3/2018 | Choi | |
| 2018/0092466 | A1 | 4/2018 | Harrow | |

OTHER PUBLICATIONS

YouTube video clip entitled "Zinus | Easy to Assemble Snnartbase (Official)," uploaded on Apr. 6, 2016 by user "Zinus". retrieved from Internet: <https://www.youtube.com/watch?v=lknPMnJRtWc> (Year: 2016).*

* cited by examiner

FOLDING BEDSTEAD

CROSS-REFERENCE(S) TO RELATED APPLICATION

The present application claims priority to Chinese Patent Application No. 201621000707.3, filed on Aug. 31, 2016, the entire contents of which are incorporated herein for all purposes by this reference.

FIELD OF THE INVENTION

The present disclosure relates to bedsteads. More particularly, the present disclosure relates to bedsteads configured for ease of assembly and disassembly and hubs to facilitate ease of assembly and disassembly.

BACKGROUND

In general, people require articles of daily use to have various adjustable functions to accommodate the increasingly rapid pace of life. For many households, bedsteads are a necessity and expected to be foldable to reduce occupied volume when stowed away. The service life of a bedstead can be attributed to the build quality and adjustable foldability of the product.

Conventional bedsteads, such as the foldable bedstead disclosed in Chinese Patent Application No. 201520220950.5, utilize a unit bedstead disposed at left and right, respectively. Each unit bedstead comprises an upper frame set and a lower frame set. Each frame set comprises two lateral rods and two longitudinal rods disposed between the two lateral rods, as well as a plurality of connecting members connecting the upper and lower frame sets. The two unit bedsteads are pivotally connected at a central portion thereof by means of a connecting assembly. The connecting assembly facilitates the folding and unfolding operations, wherein the two upper and lower frames of each unit bedstead compress, and the compressed unit bedsteads fold on each other.

For the bedstead described above, when the bedstead is folded in half, the thickness thereof is small but the length and width are relatively large. The bulky dimensions of the bedstead render it difficult for a user to grab both ends of the bedstead and move the bedstead. Further, since all of the components of the bedstead are folded, the bedstead is heavy and difficult to move.

Thus, there remains a need for improved bedsteads which are more convenient to users during assembly and disassembly operations, and enable more diverse and flexible storage alternatives.

The information disclosed in this Background section is only for enhancement of understanding of the general background of the invention and should not be taken as an acknowledgement or any form of suggestion that this information forms the prior art already known to a person skilled in the art.

BRIEF SUMMARY

Advantageously, the bedstead detailed in the present disclosure addresses the shortcomings in the prior art detailed above.

Various aspects of the present disclosure are directed to providing bedsteads configured for ease of assembly and disassembly by utilizing a hub.

One aspect of the present invention provides a bedstead. The bedstead comprises a frame defining an interior of the bedstead when the bedstead is in an unfolded state. The frame includes a first lateral bar and a second lateral bar, each comprising a first lateral segment and a second lateral segment pivotally connected with each other. The frame further includes a first longitudinal bar and a second longitudinal bar, each comprising a first longitudinal segment and a second longitudinal segment pivotally connected with each other.

When the bedstead is in the unfolded state, the first lateral bar and the second lateral bar are disposed at a head side and a foot side of the bedstead respectively and the first longitudinal bar and the second longitudinal bar are disposed at a left side and a right side of the bedstead respectively. Adjacent bars in the first lateral bar, the second lateral bar, the first longitudinal bar, and the second longitudinal bar are connected with each other at ends thereof.

The bedstead also comprises an interior support disposed within the interior defined by the frame when the bedstead is in the unfolded state. The interior support comprises a hub including a plurality of notches, and further comprises a plurality of connecting bars, each having a first end portion pivotally connected with a corresponding notch in the plurality of notches and a second end portion removably connected with the frame.

In some embodiments, the bedstead further comprises a plurality of supporting bars disposed in the interior defined by the frame when the bedstead is in the unfolded state. Each supporting bar in the plurality of supporting bars has a first end portion removably coupled with one of the connecting bars of the interior support and a second end portion removably coupled with one of the first lateral bar, the second lateral bar, the first longitudinal bar, and the second longitudinal bar of the frame.

In some embodiments, the bedstead further comprises a plurality of legs including a first leg coupled with the hub and the remaining legs coupled with the frame. When the bedstead is in the unfolded state, the first leg is disposed below the hub and the remaining legs are disposed below the frame.

In some embodiments, the hub is disposed in a central portion of the interior defined by the frame when the bedstead is in the unfolded state.

In some embodiments, the plurality of notches of the hub comprises first, second, third and fourth notches collectively forming a cross "+"-shape. The plurality of connecting bars comprises a first lateral connecting bar, a second lateral connecting bar, a first longitudinal connecting bar and a second longitudinal connecting bar, each having the first end portion pivotally connected with one of the first, second, third and fourth notches and the second end portion removably connected with one of the first lateral bar, the second lateral bar, the first longitudinal bar, and the second longitudinal bar.

In some embodiments, the bedstead further comprises a plurality of supporting bars disposed in the interior defined by the frame when the bedstead is in the unfolded state. Each supporting bar in the plurality of supporting bars has a first end portion removably coupled with one of the first lateral connecting bar, the second lateral connecting bar, the first longitudinal connecting bar and the second longitudinal connecting bar, and a second end portion removably coupled with one of the first lateral bar, the second lateral bar, the first longitudinal bar, and the second longitudinal bar.

In some embodiments, the bedstead further comprises a plurality of "∪"-shaped first support bearings, each disposed on a side of one of the first lateral connecting bar, the second lateral connecting bar, the first longitudinal connecting bar and the second longitudinal connecting bar, and configured to detachably couple with the first end portion of a supporting bar in the plurality of supporting bars. The bedstead further comprises a plurality of "U"-shaped second support bearings, each disposed on an internal side of one of the first lateral bar, the second lateral bar, the first longitudinal bar, and the second longitudinal bar, and configured to detachably couple with the second end portion of a supporting bar in the plurality of supporting bars.

In an embodiment, each of "U"-shaped first support bearings is disposed on the side of the first or second longitudinal connecting bar, and each of "U"-shaped second support bearings is disposed on the internal side of the first or second longitudinal bar. When the folding bedstead is unfolded, the plurality of supporting bars is disposed in a common direction substantially parallel to the first or second lateral bar.

In another embodiment, each of "U"-shaped first support bearings is disposed on the side of the first or second lateral connecting bar, and each of "U"-shaped second support bearings is disposed on the internal side of the first or second lateral bar. When the folding bedstead is unfolded, the plurality of supporting bars is disposed in a common direction substantially parallel to the first or second longitudinal bar.

In some embodiments, corresponding to a respective connecting bar in the plurality of connecting bars, the hub further comprises a step-shaped platform comprising a first plane configured to abut a bottom face of the respective connecting bar when the respective connecting bar is in an unfolded state, and a second plane configured to abut the bottom face of the respective connecting bar when the respective connecting bar is in a folded state.

In some embodiments, a respective connecting bar in the plurality of connecting bars comprises a clip disposed at the second end portion thereof, and the frame comprises a slot disposed at an internal side of the frame configured to be removably coupled with the clip at the second end portion of the respective connecting bar.

In some embodiments, a width of the slot is equal to or greater than a thickness of the clip to facilitate insertion of the clip in the slot.

In some embodiments, a length of the first lateral segment is substantially equal to a length of the second lateral segment, and a length of the first longitudinal segment is substantially equal to a length of the second longitudinal segment.

In some embodiments, the first lateral bar, the second lateral bar, the first longitudinal bar, and the second longitudinal bar collectively form a rectangle.

In some embodiments, each of the first lateral bar, the second lateral bar, the first longitudinal bar, and the second longitudinal bar are formed of a hollow tube.

In some embodiments, each of the first and second lateral bars comprises a first end portion bent toward and connected with the first longitudinal bar, and a second end portion bent toward and connected with the second longitudinal bar.

In some embodiments, each of the first and second lateral bars further comprise a first extension portion fixedly coupled with the first end portion, and a second extension portion fixedly coupled with the second end portion. The first extension portion is configured to be removably coupled with the first longitudinal bar, and the second extension portion is configured to be removably coupled with the second longitudinal bar.

In some embodiments, the bedstead further comprises a plurality of first connectors and a plurality of second connectors, wherein each of the first connectors pivotally connects the first and second lateral segments of the first or second lateral bar, and each of the second connectors pivotally connects the first and second longitudinal segments of the first or second longitudinal bar.

In some embodiments, the bedstead further comprises: a first leg coupled with the hub; a plurality of second legs each coupled with a first connector which is a member of the plurality of first connectors; a plurality of third legs, each coupled with a connector in the plurality of second connectors; a plurality of "U"-shaped brackets, each pivotally coupled with one of the first and second lateral bars at a position adjacent to an end portion thereof; and a plurality of fourth legs, each fixedly coupled with a "U"-shaped bracket in the plurality of "U"-shaped brackets. When the folding bedstead is in the unfolded state, the first leg is disposed below the hub, and the second, third and fourth legs are disposed below the frame.

In some embodiments, each respective "U"-shaped bracket in the plurality of "U"-shaped brackets are formed with a through hole spaced apart with a pivot point thereof. In the present case, the bedstead further comprises a fastening member for each respective "U"-shaped bracket. The fastening member fixes the respective "U"-shaped bracket with the first or second lateral bar through the through hole thereof when the corresponding fourth leg is deployed, thereby preventing the corresponding fourth leg from rotating.

In some embodiments, the fastening member is any one selected from the group consisting of a spring buckle, a bolt, and a bow-tie shaped screw.

The bedstead of the present invention has other features and advantages that will be apparent from, or are set forth in more detail in, the accompanying drawings, which are incorporated herein, and the following Detailed Description, which together serve to explain certain principles of exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject" and "user" are used interchangeably herein.

Various aspects of the present disclosure are directed to providing bedsteads. In general, a bedstead of the present disclosure includes a frame which defines an interior of the bedstead, a hub, and a plurality of connecting bars disposed between the frame and the hub. A plurality of notches is provided on the hub, such that each connecting bar is pivotally connected to a notch of the hub. The connecting bars are removably coupled to the frame to facilitate easy and quick assembly and disassembly of the bedstead. In some embodiments, a plurality of legs is disposed below the frame, such that the legs support the frame when in an unfolded state. Further, in some embodiments, a leg is disposed below the hub to further support the bedstead.

Figure 1:
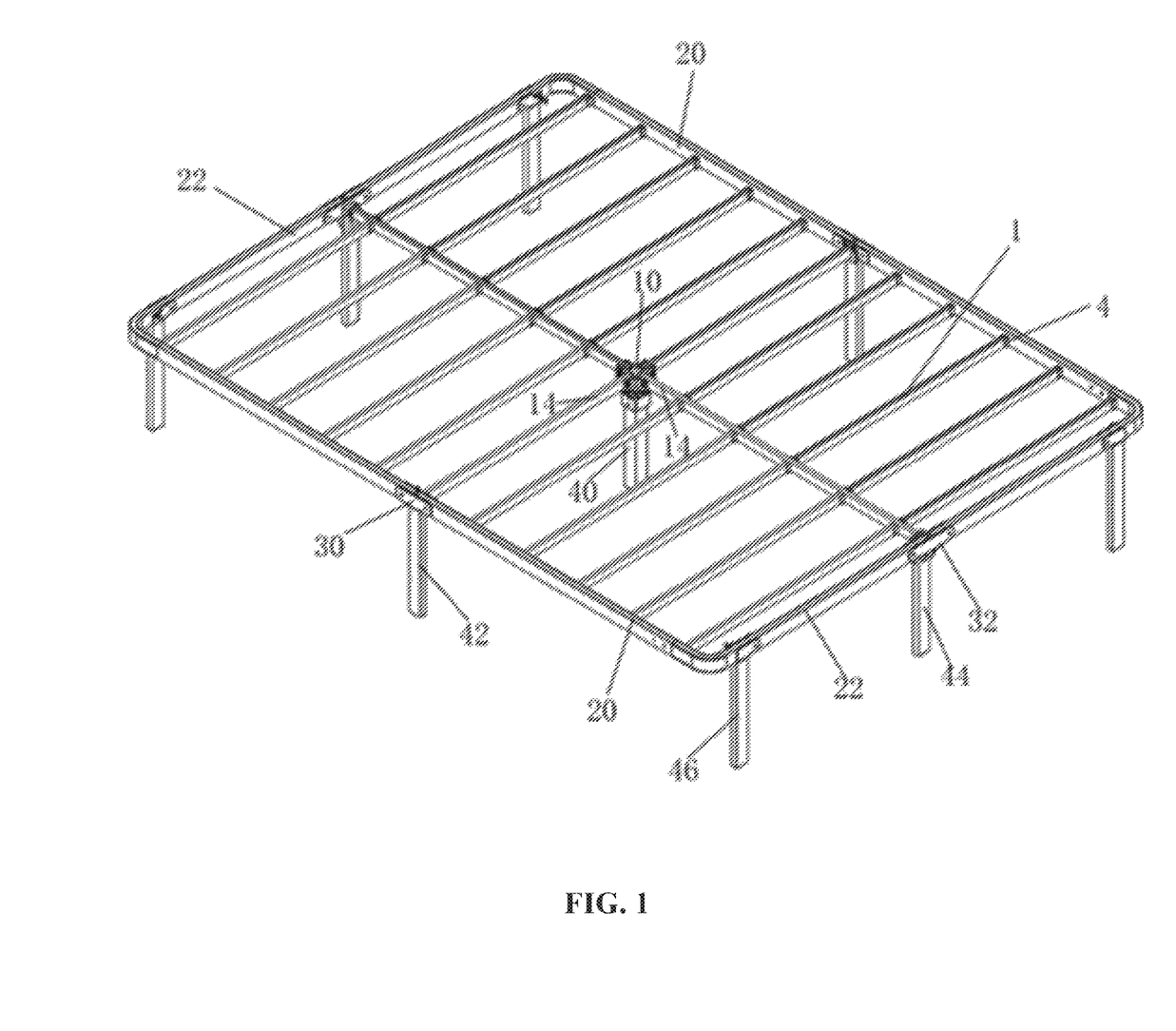
FIG. 1 is a schematic view of a bedstead according to an exemplary embodiment of the present disclosure.

Referring to FIG. 1, there is depicted an exemplary folding bedstead in accordance with various exemplary embodiments of the present disclosure. As shown, a bedstead includes a frame which defines an interior of the bedstead when the bedstead is in an unfolded state. In the present embodiment, the frame comprises first longitudinal bar 20, second longitudinal bar 20, first lateral bar 22, and second lateral bar 22. When the bedstead is in the unfolded state, first lateral bar 22 and second lateral bar 22 are disposed at a head side and a foot side of the bedstead respectively, and first longitudinal bar 20 and second longitudinal bar 20 are disposed at a left side and a right side of the bedstead respectively.

Figure 4:
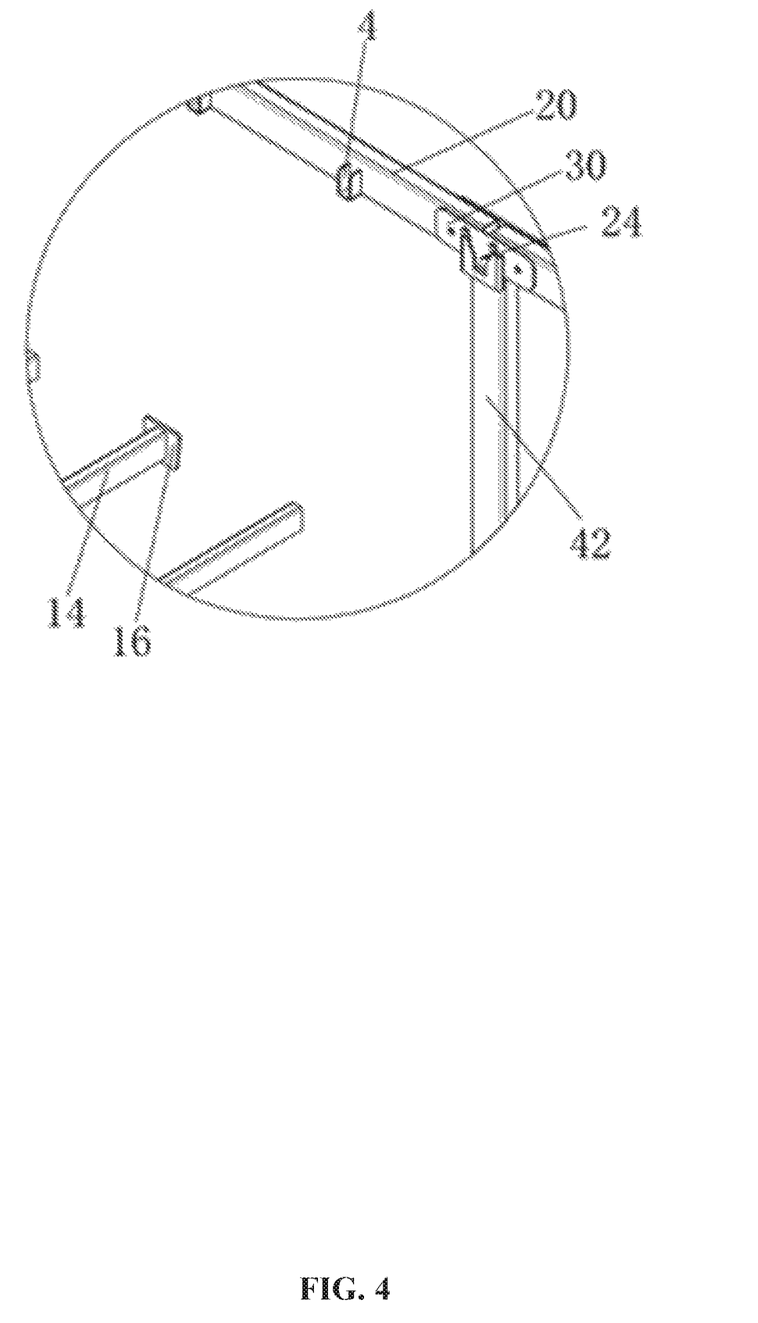
FIG. 4 is an enlarged view of region C in FIG. 3.

In the present embodiment, adjacent bars of first lateral bar 22, second lateral bar 22, first longitudinal bar 20, and second longitudinal bar 20 are coupled with each other at end portions thereof, thereby collectively substantially forming a rectangle. Further, each of first lateral bar 22 and second lateral bar 22 comprise a first lateral segment and a second lateral segment pivotally coupled with each other, and each of first longitudinal bar 20 and second longitudinal bar 20 comprise a first longitudinal segment and second longitudinal segment pivotally coupled with each other. In some embodiments, a length of the first lateral segment is substantially equal to a length of the second lateral segment, and a length of the first longitudinal segment is substantially equal to a length of the second longitudinal segment. In some embodiments, first connector 30 pivotally couples first and second longitudinal segments of first or second longitudinal bars 20, and second connector 32 pivotally couples first and second lateral segments of first or second lateral bars 22, as illustrated in FIG. 1 and FIG. 4.

In some embodiments, each of the first lateral bar 22, second lateral bar 22, first longitudinal bar 20, and second longitudinal bar 20 is formed of a hollow tube, minimizing an overall weight of the bedstead.

Figure 3:
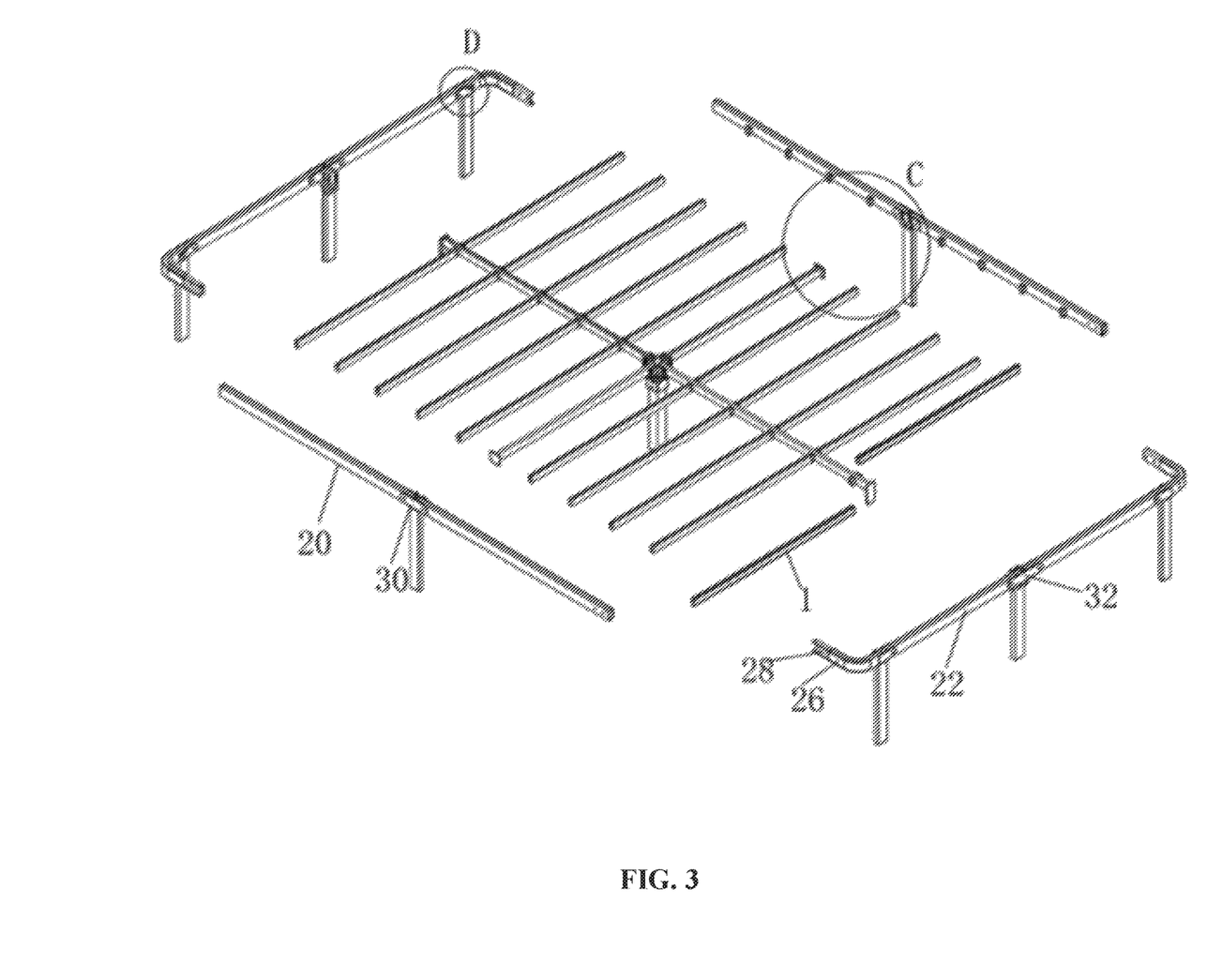
FIG. 3 is a partially exploded view of a bedstead according to an exemplary embodiment of the present disclosure.

In some embodiments, a lateral or longitudinal bar comprises a bent end portion to facilitate connection of the lateral or longitudinal bar with its adjacent bar. In some embodiments, the bent end portion comprises an extension portion to further facilitate the connection. By way of example, FIG. 3 illustrates each of first and second lateral bars 22 comprising first bent end portion 26 bent towards first longitudinal bar 20 and second bent end portion 26 bent towards second longitudinal bar 20. First and second bent end portions 26 each further comprise first and second extension portions 28 respectively fixedly coupled thereon. First extension portion 28 is removably coupled with first longitudinal bar 20 and second extension portion 28 is removably coupled with second longitudinal bar 20. In the present case, the frame can be partially assembled from the folded state to the unfolded state by inserting extension portion 28 of bent end portion 26 into longitudinal bar 20, and dismantled according to the reverse operation.

The bedstead also comprises an interior support configured to detachably couple with the frame. Such an interior support allows the bedstead to fold into a more compact configuration so that a user can easily move or store the bedstead. In many embodiments, an interior support comprises a hub such as hub 10 and a plurality of connecting bars such as connecting bars 14 illustrated in FIG. 2 and FIG. 3. In some embodiments, the hub is formed with a plurality of notches such as notches 12, such that each connecting bar in the plurality of connecting bars has a first end portion pivotally coupled to a corresponding notch and a second end portion removably coupled to the frame.

Figure 2:
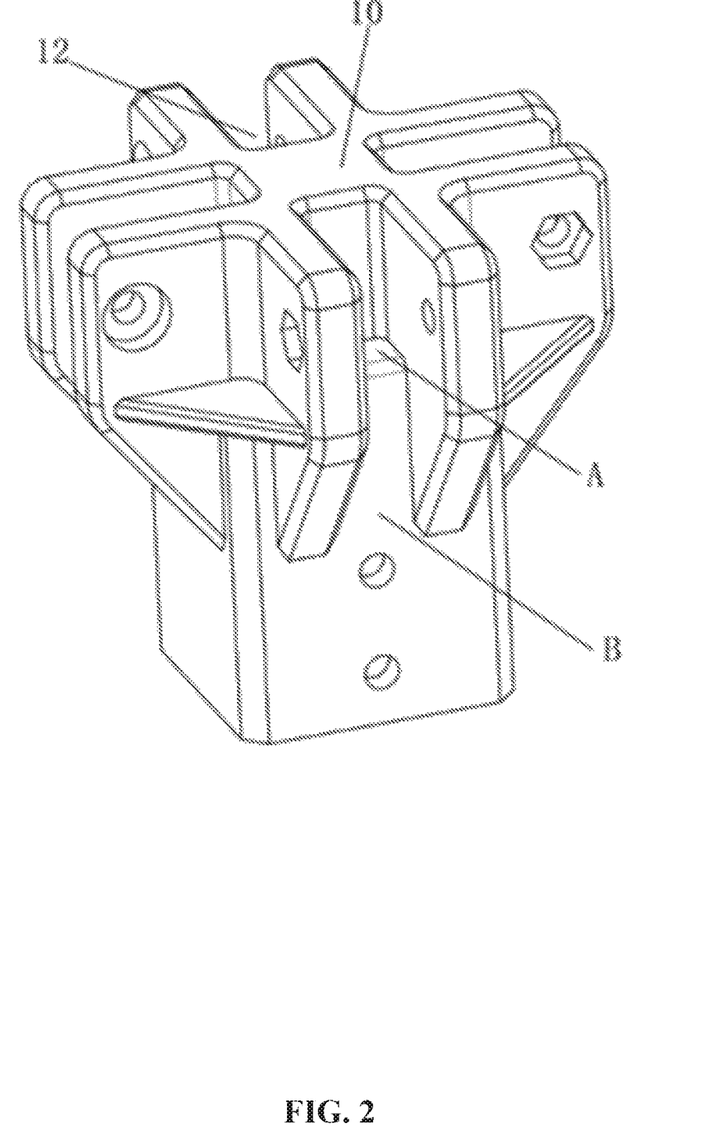
FIG. 2 is a schematic view of a hub according to an exemplary embodiment of the present disclosure.

In some embodiments, hub 10 and a plurality of connecting bars 14 are disposed at a central portion of the interior defined by the frame. Hub 10 is provided with first, second, third, and fourth notches 12, and the plurality of connecting bars 14 consist of first lateral connecting bar 14, second lateral connecting bar 14, first longitudinal connecting bar 14, and second longitudinal connecting bar 14. In an embodiment, first, second, third, and fourth notches 12 are arranged in a cross "+"-shape, wherein each notch 12 is configured to accommodate a respective connecting bar 14. Each connecting bar 14 has a first end portion pivotally coupled with one of first, second, third, and fourth notches 12 and a second end portion removable coupled with one of first lateral bar 22, second lateral bar 22, first longitudinal bar 20, and second longitudinal bar 20.

In some embodiments, hub 10 further comprises a step-shaped platform comprising first plane A and second plane B, each plane configured to abut a bottom face of a connecting bar 14. When the bedstead is in the unfolded state, the bottom face of connecting bar 14 is flush with plane A, and when the bedstead is in the folded state, the bottom face of connecting bar 14 is flush with plane B.

Referring to FIG. 3 and FIG. 4, in some embodiments, slot 24 is disposed at an internal side of the frame, and clip 16 is disposed at the second end portion of each connecting bar 14 wherein clip 16 is inserted and removably coupled with slot 24. Slot 24 has a width which is equal to or greater than a thickness of clip 16, in order to facilitate insertion of clip 16 into slot 24. In the present case, connecting bars 14 are removably coupled to the frame of the bedstead and able to support a load while being easily removed for folding and storage.

In some embodiments, a plurality of support bars such as support bars 1 is disposed in the interior defined by the frame and removably coupled with the frame and/or the interior support. Such support bars allows the bedstead to fold into separate uncoupled units so that a user can easily move or store the bedstead as a series of components rather than a single integral unit. In an embodiment, each supporting bar 1 in the plurality of supporting bars 1 has a first end portion removably coupled with a side of first or second longitudinal connecting bar 14 and a second end portion removably coupled with a side of the first or second longitudinal bar 20.

In some embodiments, a plurality of "∪"-shaped first support bearings 4 is disposed on the side of the first or second longitudinal connecting bar 14 and a plurality of "∪"-shaped second support bearings 4 is disposed on the internal side of the first or second longitudinal bar 20. As such, the first end portion of support bar 1 is detachably coupled with first support bearing 4 and the second end portion of support bar 1 is detachably coupled with second support bearing 4.

The present disclosure, however, is not limited to the above configuration(s). For instance, the lateral and longitudinal connecting bars can be, but do not necessarily need to be, substantially perpendicular to each other. Further, these components can be, but do not necessarily need to be, substantially parallel to the lateral and longitudinal bars of the frame as in the illustrated embodiment. Also, the support bars can be, but do not necessarily need to be, in a common direction such that each support bar extends along a same direction as an adjacent support bar; they can be disposed in the frame in any suitable direction(s), and they can be connected to any one of the lateral and longitudinal bars of the frame and the interior support. Further, support bearings can be disposed at any one of the lateral and longitudinal bars of the frame and the interior support. For example, in an embodiment, each first support bearing is disposed on a side of one of the first lateral connecting bar, second lateral connecting bar, first longitudinal connecting bar, and the second longitudinal connecting bar, and each second support bearing is disposed on an internal side of one of the first lateral bar, second lateral bar, first longitudinal bar, and the second longitudinal bar.

Bedsteads of the present invention can comprise additional, optional or alternative components. For instance, in some embodiments, a bedstead of the present invention comprises a plurality of "∪"-shaped brackets such as brackets 50 illustrated in FIGS. 1, 5 and 6. An exemplary "∪"-shaped bracket is configured to allow a leg to fold and unfold with respect to the frame, and prevent the leg from rotating when deployed in the unfolded state.

Figure 5:
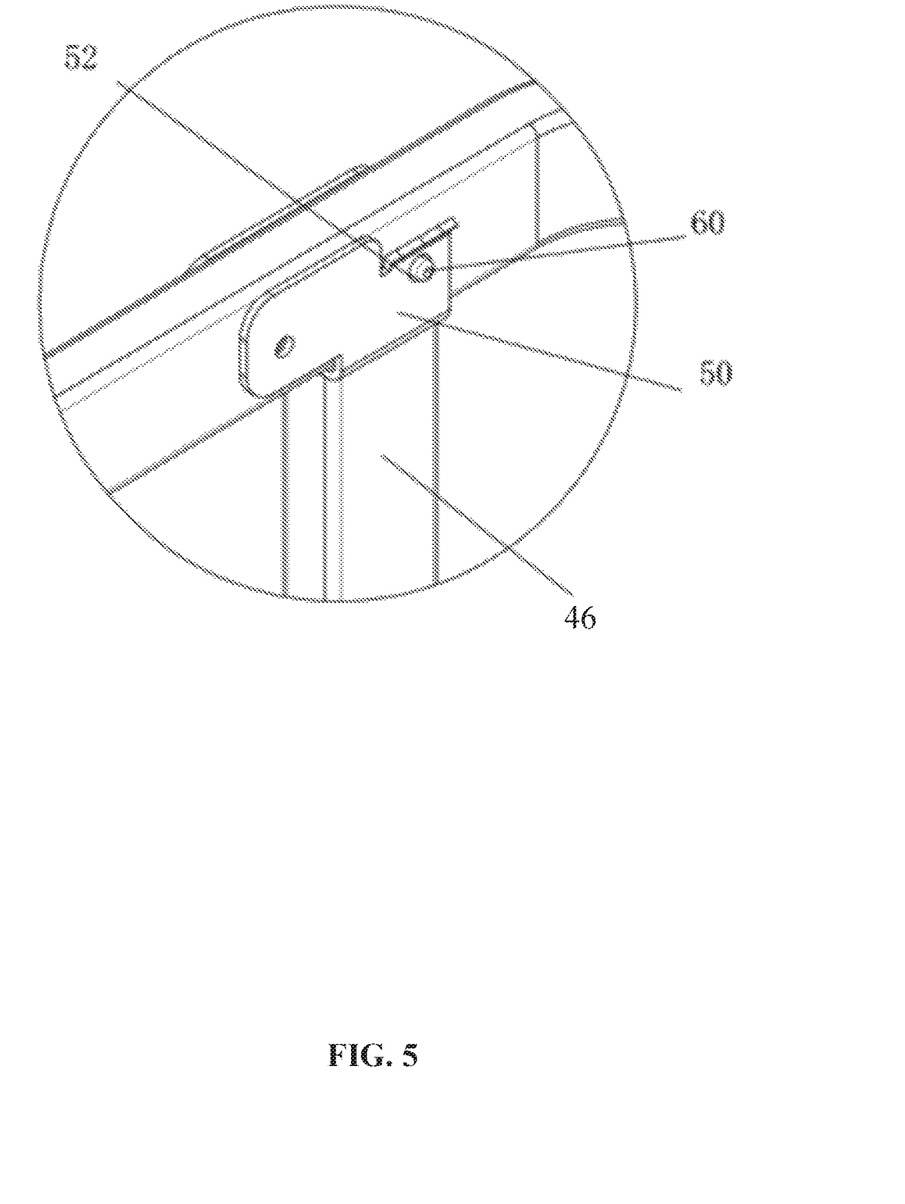
FIG. 5 is an enlarged view of region D in FIG. 3.
Figure 6:
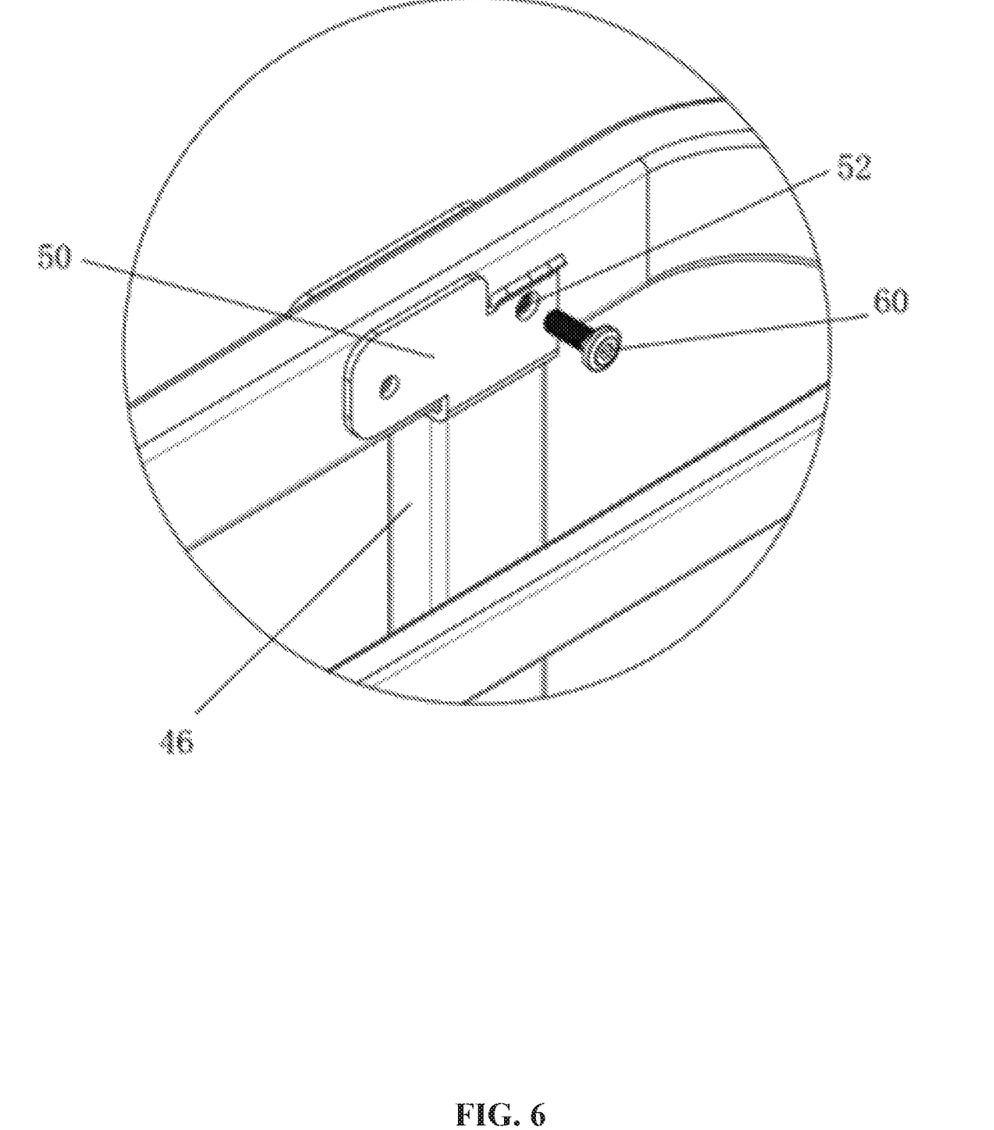
FIG. 6 is a schematic view of a fastening member according to an exemplary embodiment of the present disclosure.

The "∪"-shaped brackets can be disposed at and coupled with any one of the lateral or longitudinal bars of the frame. By way of example, FIGS. 1, 5 and 6 illustrates each "∪"-shaped bracket 50 which is pivotally coupled with one of first and second lateral bars 22 at a position adjacent to an end portion thereof. In some embodiments, each "∪"-shaped bracket 50 is formed with through hole 52 distanced from a pivot point thereon "∪"-shaped bracket 50. Fastening member 60 corresponds to each "∪"-shaped bracket 50, such that fastening member 60 fixes "∪"-shaped bracket 50 with first or second lateral bar 22 through through hole 52 when fourth leg 46 is deployed, preventing rotation of fourth leg 46.

In an embodiment, first leg 40 is coupled with hub 10, a plurality of second legs 42 each coupled with first connecting base 30, a plurality of third legs 44 each coupled with second connecting base 32, and a plurality of fourth legs 46 each fixedly coupled with a corresponding "∪"-shaped bracket 50. In some embodiments, fastening member 60 is any one selected from the group consisting of a spring buckle, a bolt, and a bow-tie shaped screw.

To disassemble the bedstead according to an exemplary embodiment of the present disclosure, support bars 1 are removed from support bearings 4. Then, clip 16 of connecting bar 14 is removed from slot 24, separating connecting bar 14 and hub 10 from the frame, and thus allowing hub 10 and connecting bars 14 to be folded together. Lateral bars 22 and longitudinal bars 20 are separated after removal of the bolts, and longitudinal bars 20 are folded in half. To dismantle lateral bars 22, fastening member 60 is disassembled such that "∪"-shaped bracket 50 can rotate about the pivot point, and thus allow fourth leg 46 to rotate. Disassembly is complete by folding the lateral and longitudinal bars 20 and 22 in half.

For convenience in explanation and accurate definition in the appended claims, the terms "upper", "lower", "up", "down", "upwards", "downwards", "inner", "outer", "inside", "outside", "inwardly", "outwardly", "interior", "exterior", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bedstead comprising:
a frame defining an interior when the bedstead is in an unfolded state and comprising:
a first lateral bar and a second lateral bar, each comprising a first lateral segment and a second lateral segment pivotally connected with each other; and
a first longitudinal bar and a second longitudinal bar, each comprising a first longitudinal segment and a second longitudinal segment pivotally connected with each other,
wherein when the bedstead is in the unfolded state, the first lateral bar and the second lateral bar are disposed at a head side and a foot side of the bedstead respectively, the first longitudinal bar and the second longitudinal bar are disposed at a left side and a right side of the bedstead respectively, and adjacent bars in the first lateral bar, the second lateral bar, the first longitudinal bar, and the second longitudinal bar are connected with each other at ends thereof; and
an interior support disposed in the interior defined by the frame when the bedstead is in the unfolded state, the interior support comprising:
a hub comprising a plurality of notches; and
a plurality of connecting bars, each having a first end portion pivotally connected with a corresponding notch in the plurality of notches of the hub and a second end portion removably connected with the frame without dissembling either the frame or the interior support, wherein corresponding to a respective connecting bar in the plurality of connecting bars, the hub further comprises:

a step-shaped platform comprising a first plane configured to abut a bottom face of the respective connecting bar when the respective connecting bar is in an unfolded state, and a second plane configured to abut the bottom face of the respective connecting bar when the respective connecting bar is in a folded state, wherein the bottom face of the respective connecting bar faces downward with respect to the hub when the respective connecting bar is in the unfolded state.

2. The bedstead of claim 1, further comprising:
a plurality of supporting bars disposed in the interior defined by the frame when the bedstead is in the unfolded state, wherein each supporting bar in the plurality of supporting bars has a first end portion removably coupled with one of the connecting bars of the interior support and a second end portion removably coupled with one of the first lateral bar, the second lateral bar, the first longitudinal bar, and the second longitudinal bar of the frame.

3. The bedstead of claim 1, further comprising:
a plurality of legs comprising a first leg coupled with the hub and the remaining legs coupled with the frame, wherein when the bedstead is in the unfolded state, the first leg is disposed below the hub and the remaining legs below the frame.

4. The bedstead of claim 1, wherein the hub is disposed in a central portion of the interior defined by the frame when the bedstead is in the unfolded state.

5. The bedstead of claim 1, wherein:
the plurality of notches of the hub comprises first, second, third and fourth notches collectively forming a cross "+"-shape; and
the plurality of connecting bars comprises a first lateral connecting bar, a second lateral connecting bar, a first longitudinal connecting bar and a second longitudinal connecting bar, each having the first end portion pivotally connected with one of the first, second, third and fourth notches and the second end portion removably connected with one of the first lateral bar, the second lateral bar, the first longitudinal bar, and the second longitudinal bar.

6. The bedstead of claim 5, further comprising:
a plurality of supporting bars disposed in the interior defined by the frame when the bedstead is in the unfolded state, wherein each supporting bar in the plurality of supporting bars has a first end portion removably coupled with one of the first lateral connecting bar, the second lateral connecting bar, the first longitudinal connecting bar and the second longitudinal connecting bar, and a second end portion removably coupled with one of the first lateral bar, the second lateral bar, the first longitudinal bar, and the second longitudinal bar.

7. The bedstead of claim 6, further comprising:
a plurality of "U"-shaped first support bearings, each disposed on a side of one of the first lateral connecting bar, the second lateral connecting bar, the first longitudinal connecting bar and the second longitudinal connecting bar, and configured to detachably couple with the first end portion of a supporting bar in the plurality of supporting bars; and a plurality of "U"-shaped second support bearings, each disposed on an internal side of one of the first lateral bar, the second lateral bar, the first longitudinal bar, and the second longitudinal bar, and configured to detachably couple with the second end portion of a supporting bar in the plurality of supporting bars.

8. The bedstead of claim 7, wherein:
each of "U"-shaped first support bearings is disposed on the side of the first or second longitudinal connecting bar;
each of "U"-shaped second support bearings is disposed on the internal side of the first or second longitudinal bar; and
when the folding bedstead is unfolded, the plurality of supporting bars is disposed in a common direction substantially parallel to the first or second lateral bar.

9. The bedstead of claim 7, wherein:
each of "U"-shaped first support bearings is disposed on the side of the first or second lateral connecting bar;
each of "U"-shaped second support bearings is disposed on the internal side of the first or second lateral bar; and
when the folding bedstead is unfolded, the plurality of supporting bars is disposed in a common direction substantially parallel to the first or second longitudinal bar.

10. The bedstead of claim 1, wherein:
a respective connecting bar in the plurality of connecting bars comprises a clip at the second end portion thereof; and
the frame comprises a slot disposed at an internal side of the frame to removably couple with the clip at the second end portion of the respective connecting bar.

11. The bedstead of claim 10, wherein a width of the slot is equal to or greater than a thickness of the clip to facilitate insertion of the clip in the slot.

12. The bedstead of claim 1, wherein a length of the first lateral segment is substantially equal to a length of the second lateral segment, and a length of the first longitudinal segment is substantially equal to a length of the second longitudinal segment.

13. The bedstead of claim 1, wherein the first lateral bar, the second lateral bar, the first longitudinal bar, and the second longitudinal bar collectively substantially form a rectangle.

14. The bedstead of claim 1, wherein each of the first lateral bar, the second lateral bar, the first longitudinal bar, and the second longitudinal bar is formed of a hollow tube.

15. The bedstead of claim 1, wherein each of the first and second lateral bars comprises a first end portion bended toward and connected with the first longitudinal bar, and a second end portion bended toward and connected with the second longitudinal bar.

16. The bedstead of claim 15, wherein each of the first and second lateral bars further comprises a first extension portion having fixedly coupled with the first end portion and a second extension portion fixedly coupled with the second end portion, wherein the first extension portion is configured to removably couple with the first longitudinal bar, and the second extension portion is configured to removably couple with the second longitudinal bar.

17. The bedstead of claim 1, further comprising:
a plurality of first connectors, each pivotally connecting the first and second lateral segments of the first or second lateral bar; and
a plurality of second connectors, each pivotally connecting the first and second longitudinal segments of the first or second longitudinal bar.

18. The bedstead of claim 17, further comprising:
a first leg coupled with the hub;
a plurality of second legs, each coupled with a connector in the plurality of first connectors;
a plurality of third legs, each coupled with a connector in the plurality of second connectors;
a plurality of "∪"-shaped brackets, each pivotally coupled with one of the first and second lateral bar at a position adjacent to an end portion thereof; and
a plurality of fourth legs, each fixedly coupled with a "∪"-shaped bracket in the plurality of "∪"-shaped brackets,
wherein when the folding bed is in the unfolded state, the first leg is disposed below the hub, and the second, third and fourth legs are disposed below the frame.

19. The bedstead of claim 18, wherein each respective "∪"-shaped bracket in the plurality of "∪"-shaped brackets is formed with a through hole spaced apart with a pivot point thereof, the bedstead further comprising:
a fastening member for each respective "∪"-shaped bracket, wherein the fastening member fixes the respective "520 "-shaped bracket with the first or second lateral bar through the through hole thereof when the correspond fourth leg is deployed, thereby preventing the corresponding fourth leg from rotating.

20. The bedstead of claim 19, wherein the fastening member is any one selected from the group consisting of a spring buckle, a bolt, and a bow-tie shaped screw.

\* \* \* \* \*